3,230,865
PROCESS AND DEVICE FOR REMOVING LIQUIDS FROM SOLIDS
Josef Hibbel, Oberhausen-Sterkrade, Franz Schaub, Oberhausen-Holten, and Dietmar Franz, Lampertheim, Germany, assignors to Ruhrchemie Aktiengesellschaft, Oberhausen-Holten, Germany, a corporation of Germany
Filed June 14, 1963, Ser. No. 288,051
Claims priority, application Germany, June 22, 1962, R 32,974
9 Claims. (Cl. 100—37)

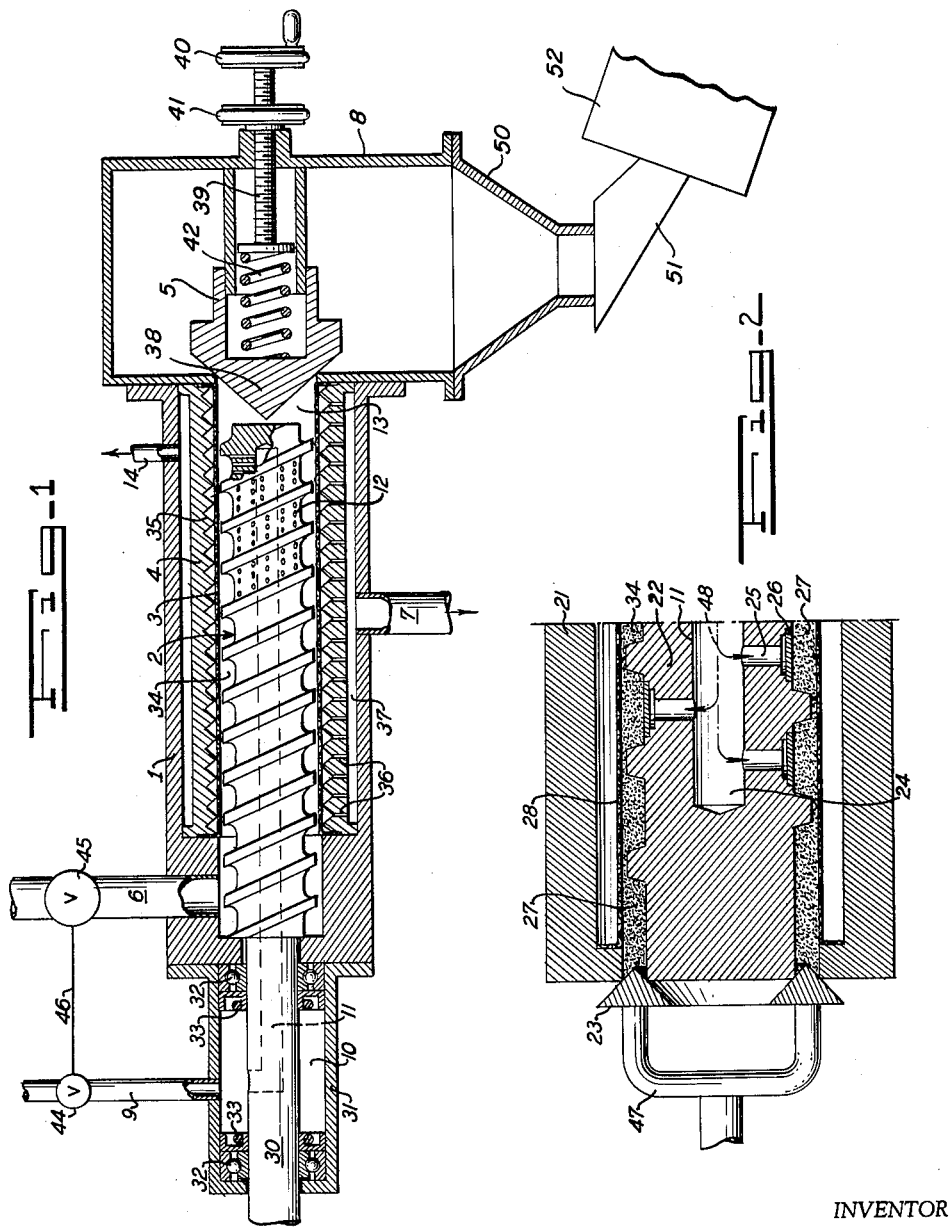

It is known to remove part of the liquid from solid-liquid suspensions mechanically and to obtain the said solids in form of a filter cake by passing such a suspension through a screw filter press, wherein fluid is separated from the solids content at a filter element or screen, and the solids are conveyed by means of one or several parallel, spaced, cooperating conveyor screws along the filter screen towards a discharge opening. In the process, the solid is compressed and discharged against the pressure of a sealing or throttling member.

With a filter device of the type described, the solids can generally be freed from the liquid up to a liquids content of 80 to 100 volume percent, dependent upon the solid substance. The extent of removal of liquid by increasing the pressure exerted on the solids by the throttling member is limited. If the cake is compacted too much, the solid particles cake or sinter together so that the drive power required becomes excessively high.

In most cases, the solid substance, mechanically depleted from liquid in the filter press must be freed wholly or in part from its residual liquid content by a thermal after treatment. The latter can be simplified and rendered more economical, if the liquid is removed as far as possible in the screw filter press.

This is accomplished according to the invention, by blowing a gas across the filter cake perpendicular to the direction of conveyance, from the shaft of the screw which can be formed as a hollow body and provided with perforations at that part of the filter screw where the spaces between the threads are filled, or substantially filled, with a solids cake.

According to the invention, in the separation of a liquid-solid admixture into liquid component and solid component, by compressing admixture against a filter screen to express liquid through the screen, while simultaneously advancing admixture in a direction perpendicular to the screen, so that the admixture becomes progressively depleted in liquid component as it is advanced in a direction perpendicular to the screen, the invention provides the step of forcing gas through the admixture radially outwardly with respect to the advance of admixture perpendicular to the screen. Preferably, the gas is passed through the admixture at a locus where the admixture is in the form of filter cake. Further, it is preferred to maintain a body of the admixture between the conduit means by means of which gas is introduced into the admixture, and the discharge end of the filtering zone, so that passage of gas through the admixture in the direction of travel of the admixture and to the outlet end of the filtering zone, is inhibited. By maintaining a body of admixture between the gas delivery conduit openings and the outlet end of the filtering zone, the gas can be made to pass radially through the admixture rather than in the direction of travel of the admixture.

According to the type of the liquid to be removed, air, steam or inert gases, as for instance nitrogen or rare gases, can be blown across the filter cake.

Generally, the desired effect is performed by using a gas volume in Nm.³ about 1-20 times the volume of the filter cake.

The required gas pressure depends primarily upon the particle size of the solid material, the thickness of the filter cake and the pressure under which the solids suspension is charged to the device. Generally, a pressure of 0.5–4 atm., preferably of about 1–2 atm. is satisfactory for obtaining the desired gas flow rate, however, the pressure should be at least 0.2 atm. higher than the pressure of the solids suspension delivered to the screw press. Preferably, the gas pressure is regulated by means of a control device known in the art in such manner that a preselected optimal difference between the pressure of the suspension entering the device and the gas pressure is maintained during the operation.

The process is applicable to screw presses, known in the art, wherein solids suspensions are passed by means of one or several parallel spaced apart cooperating conveyor screws along a filter surface means towards an opening from which the solids emerge against a sealing member adjusted to a distinct pressure. Herein, the hollow shafts of the screws are provided with gas permeable openings in that part of the filter screw press, wherein the spaces between the threads of the screw conveyor are filled with the solids cake. The gas permeable openings may be formed by bore holes, sinter plates, sieves, etc. inserted in the wall of the hollow screw shaft. They are arranged in such manner that a drying gas can be blown through the filter cake perpendicular to the direction of the conveyance.

The gas distributor elements are preferably arranged adjacent the discharge opening of the screw press in the range of about the last up to the fourth last screw thread, and in such manner that the gas passes almost uniformly through the filter cake.

Moreover, between the last screw thread and the discharge of the filter cake, there should generally remain a length of about 0.5–2.0 D ($D$=outer diameter of the screw) without conveying members and gas distributor elements, or at least without gas distributor elements. This will prevent undesirable emerging of gas at the discharge opening for the filter cake. For this purpose, the use of a ring or cone shaped sealing device is especially well suited. This provides an annular shaped discharge opening. A ring shaped sealing device is preferred, since it assures a very good, tight sealing.

The gas essentially displaces the liquid retained in the pores of the filter cake, passes through the filter surface into the housing of the screw press, from which it is removed through a separate discharge conduit or together with the filtrate. It can be freed from liquid, compressed and recirculated for further use.

The blowing of a filter cake in rotating filters or similar filter devices is known. The application of this measure during mechanically removing liquid from solids suspensions in screw filter presses according to the invention offers the particular advantage, that—perhaps owing to the relatively high compression of the filter cake in the screw press—only very small amounts of gas are required for decreasing the liquids content of the solid material to a fraction of the value obtainable without blowing of the filter cake. It is by dint of this measure, that the following thermal treatment of the solids can be performed in a much shorter time or in a smaller device, or with a higher throughput.

The invention is further described in the accompanying drawings, wherein:

FIG. 1 is an elevational view in cross-section of a filter press according to the invention; and FIG. 2 is an elevation view in cross-section of a portion of a filter press according to the invention showing the discharge end thereof, the discharge end being of a construction alternative to that shown in FIG. 1.

In the various views of the drawing, like reference characters refer to corresponding parts.

The apparatus of the invention comprises a filter press including an elongated chamber for liquid-solid admixture and having an inlet for receiving liquid-solid admixture and an outlet end for discharge of admixture depleted in liquid content. A filter screen element defines a wall of the chamber and is disposed intermediate the chamber inlet end and outlet end for passage of liquid from the admixture therethrough. Means are provided for forcing admixture axially through the chamber from the inlet end toward the outlet end, whereby solids of the admixture can be advanced axially through the chamber while liquid is expressed from the admixture through the filter screen. Conduit means are provided for delivering a gas to within the admixture adjacent the chamber outlet end for passage radially through the admixture and on through the filter screen.

Referring to FIG. 1, the filter press comprises a casing 1 having a conveying screw 2 rotatably mounted therein. The screw shaft 30 extends through the journal box 31 wherein the bearings 32 and seals 33 are provided. The journal box 31 includes an annular space 10 about the shaft and a gas inlet 9 communicates with this space. The seals 33 serve to isolate the gas space 10. The shaft 30 is driven by any suitable drive means (not shown).

The press includes the chamber 34 which is bounded by the filter screen element 3, which is supported by a sleeve 4. The sleeve 4 is provided with notches 35 which serve as channels in which material passed through the screen 3 can be conveyed away from the chamber. Radial liquid and gas outlet openings 36 communicate with the channels 35 and serve to convey fluid from the channels to the outer annular space 37. From the outer annular space 37, fluid can flow through the fluid outlet 7. Further, a vent 14 is provided so that gas can be removed from the top of the jacket, if desired.

The chamber 34 is provided with an inlet end outfitted with inlet conduit 6, and an outlet end outfitted with the throttling means 5. The throttling means 5 includes the cone 38 which projects into the discharge opening of the chamber and permits throttling of flow through the discharge chamber. The outlet cone is provided as a valve, so that the position of the cone in the chamber outlet opening can be adjusted. Thus, the cone is spring mounted on the valve stem 39, which can be controlled by the turn wheel 40. A locking wheel 41 is provided to permit accurate positioning of the cone. Desirably, the cone is spring mounted on the stem 39 by the spring means 42. Thus, the filter is accommodated for the handling of momentary overloads without injury to the apparatus. The valve members including the cone 38, stem 39, are housed within a discharge housing 8 which receives admixture discharged from the chamber 34, and serves to deliver it to a hopper 50, which discharges the cake into a feeder 51. The feeder 51 delivers the cake to a kiln 52 wherein the cake is heated to remove further liquid therefrom.

According to the invention, means are provided for passing gas readily through the admixture treated in the filter press, preferably the gas is passed radially through the admixture at a locus where the admixture is a filter cake. Thus, desirably, the gas is introduced into the admixture at the threads adjacent the discharge end of the chamber 34. The introduction of gas can take place at the last threads up to about the fourth last thread. As illustrated in the drawing, gas is introduced into the admixtures via the radially exending openings 12, and these openings are disposed along about the last three threads of the screw shaft 2. The openings 12 which extend radially through the screw shaft 2 communicate with the axially extending bore 11 in the screw shaft and this bore communicates in turn with the annular space 10 which receives gas from the gas inlet conduit 9.

Desirably, the equipment is arranged so that the gas does not pass axially through the admixture toward the outlet end of the chamber 34 as this would defeat the purpose of sweeping the admixture prior to its arrival at the discharge end. To inhibit the passage of the gas through the chamber discharge end, the radially extending openings 12 are preferably all disposed a distance from the outlet end of the chamber 34 so that a body of admixture is maintained between the radially extending outlet openings 12 and the discharge end of the chamber, whereby passage of gas with admixture to and through the chamber outlet opening is inhibited. The screw, and more, the radially extending outlet openings can be disposed only up to a distance of about 0.5–2 times the diameter of the screw.

In order to provide uniform operation of the press, the pressure of the gas can be controlled to maintain a fixed difference between the gas pressure and the pressure of the liquid-solid admixture being treated. Thus, the gas inlet line 9 is outfitted with a control valve 44 and the liquid-solid admixture feed line 6 is outfitted with a control valve 45, and these control valves are operatively interconnected by line 46. The gas pressure can be controlled, as is depicted in the drawing, on the basis of the liquid-solid admixture feed or on the basis of another pressure of the admixture existing during the treatment thereof.

In a preferred form of the apparatus of the invention, the discharge opening of the chamber 34 is in the form of an annular opening, and, it will be observed that such a discharge opening is provided by reason of utilizing a cone 38.

In the embodiment shown in FIG. 2, the discharge opening of the chamber 34 is in the form of an annulus, and the throttling means is a ring 23 having a cone-shaped cross-section. Actuating means in the form of yoke 47 are provided for the positioning of the ring 23 to provide the desired throttling action of the discharge.

In the FIG. 2 embodiment, the radially extending openings 25 in the screw 22 are provided at their outlet ends with metal sinter plates 26. The metal sinter plates 26 are of substantially greater diameter than the radially extending outlet openings 25, and serve to provide a fine dispersion of the gas for introduction into the filter cake 27. The gas passes through the axial bore 11 to the radially extending discharge openings 25, as is indicated by the arrows 48, and through the metal sinter plates 26, then through the filter cake 27, and the screen 28.

*Example*

In a filter screw press of 150 mm. outer and 100 mm. inner diameter, a pitch of 100 mm. and a length of the sieve surface of 500 mm. the liquid content of a solids suspension (polyethylene in an organic liquid) having a solid content of 15% by weight (specific weight of the solid material about 0.95, specific weight of the liquid about 0.75, particle size of the solids about 80μ) could be separated to a residual liquid content of about 80% by weight depending upon the solids. If, at a throughput of about 1,000 kg./h., 10 m.$^3$/h. of air were blown perpendicular through the cake in a distance of 10 to 20 cm. before the discharge opening for the solids cake, the residual liquid content could be decreased to 40% by weight, depending upon the solids, at the same throughput rate.

While the invention has been described with reference to particular embodiments thereof, the embodiments described are merely representative and do not serve to define the limits of the invention.

What is claimed is:

1. The process of separating liquid from liquid-solid admixture which comprises compressing admixture against a filter screen element as a cake of the admixture and to express liquid through the screen and simultaneously advancing admixture as a cake in a direction parallel to the screen, whereby the admixture becomes progressively depleted in liquid component as it is advanced in said direction parallel to the screen, thereafter further advancing the admixture as a cake in said direction parallel to the screen and simultaneously forcing gas through the cake towards the screen to displace liquid from the cake and thereby reduce liquid content of the cake to below the liquid content corresponding to expressing liquid therefrom as aforesaid, and following forcing gas through the cake as aforesaid removing the cake from the screen and heating the cake to expel liquid therefrom.

2. Process according to claim 1, wherein the admixture is advanced in a direction parallel to the screen by a conveyor screw.

3. Process according to claim 1, wherein the gas pressure is at least about 0.2 atmosphere greater than the pressure of the liquid-solid admixture delivered to the filter press for treatment therein.

4. Process according to claim 1, wherein the volume of gas passed through the filter cake in Nm.³ is about 1–20 times the volume of said filter cake.

5. Process according to claim 1, wherein the pressure of the gas is regulated to maintain a preselected difference between the pressure of the liquid-solid admixture at a selected location and the gas, whereby to provide increased gas pressure upon increase in pressure of the liquid-solid admixture to reduce variation in the separation of liquid from the cake in dependence on the pressure of the liquid-solid admixture.

6. Process according to claim 1, the liquid removed from the cake by said gas being separated from the cake by the gas substantially entirely in liquid state.

7. Process according to claim 1, the length along the screen over which liquid is expressed from the cake as aforesaid being at least equal to the length along the screen over which liquid is displaced by forcing gas through the screen as aforesaid.

8. Filter apparatus comprising
 (a) an elongated chamber for liquid-solid admixture and having an inlet end for receiving liquid-solid admixture and an outlet end for discharge of admixture depleted in liquid content,
 (b) a filter screen element defining walls of said chamber intermediate the chamber inlet end and outlet end for passage of liquid from the admixture therethrough,
 (c) a conveyor screw for forcing admixture axially through the chamber from the inlet end toward the outlet end, whereby solids of the admixture can be advanced axially through the chamber while liquid is expressed from the admixture through the filter screen,
 (d) conduit means for delivering a gas to adjacent the chamber outlet end for passage radially through admixture adjacent the chamber outlet end and on through the filter screen, said conduit means including a passageway extending axially through the screw to adjacent the chamber outlet end and means defining radially extending openings for passage of gas from the passageway to the chamber adjacent the outlet end thereof,
 (e) said conveyor screw including a number of screw threads disposed along said filter screen, the radially extending openings being all positioned on the outlet end side of up to the fourth last screw thread, said number of threads disposed along the filter screen being in excess of twice the number of threads along which the radially extending openings are disposed.

9. Apparatus according to claim 8, and including means for controlling gas pressure in dependence upon the pressure of admixture treated in the filter.

References Cited by the Examiner

UNITED STATES PATENTS

| | | | |
|---|---|---|---|
| 604,348 | 5/1898 | Bussells | 100—117 X |
| 635,179 | 5/1901 | Wacker | 100—117 X |
| 808,193 | 12/1905 | Bussells | 100—117 X |
| 985,863 | 3/1911 | Turner et al. | |
| 1,096,199 | 5/1914 | Schuyler | 100—117 X |
| 2,216,658 | 10/1940 | Anderson | 100—41 X |
| 2,997,943 | 8/1961 | Zies | 100—117 X |

FOREIGN PATENTS 22,736   10/1948   Finland.

WALTER A. SCHEEL, *Primary Examiner.*

UNITED STATES PATENT OFFICE
CERTIFICATE OF CORRECTION

Patent No. 3,230,865 January 25, 1966

Josef Hibbel et al.

It is hereby certified that error appears in the above numbered patent requiring correction and that the said Letters Patent should read as corrected below.

Column 3, line 7, after "inlet" insert -- end --; line 62, for "readily" read -- radially --; column 6, line 36, for "635,179" read -- 675,179 --.

Signed and sealed this 17th day of January 1967.

(SEAL)
Attest:

ERNEST W. SWIDER
Attesting Officer

EDWARD J. BRENNER
Commissioner of Patents